Patented July 17, 1923.

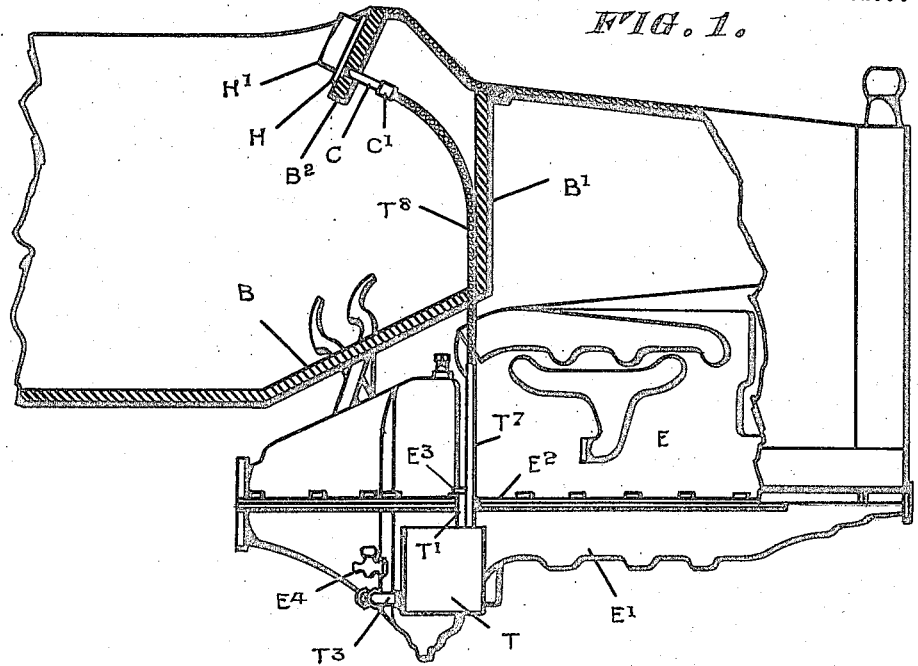
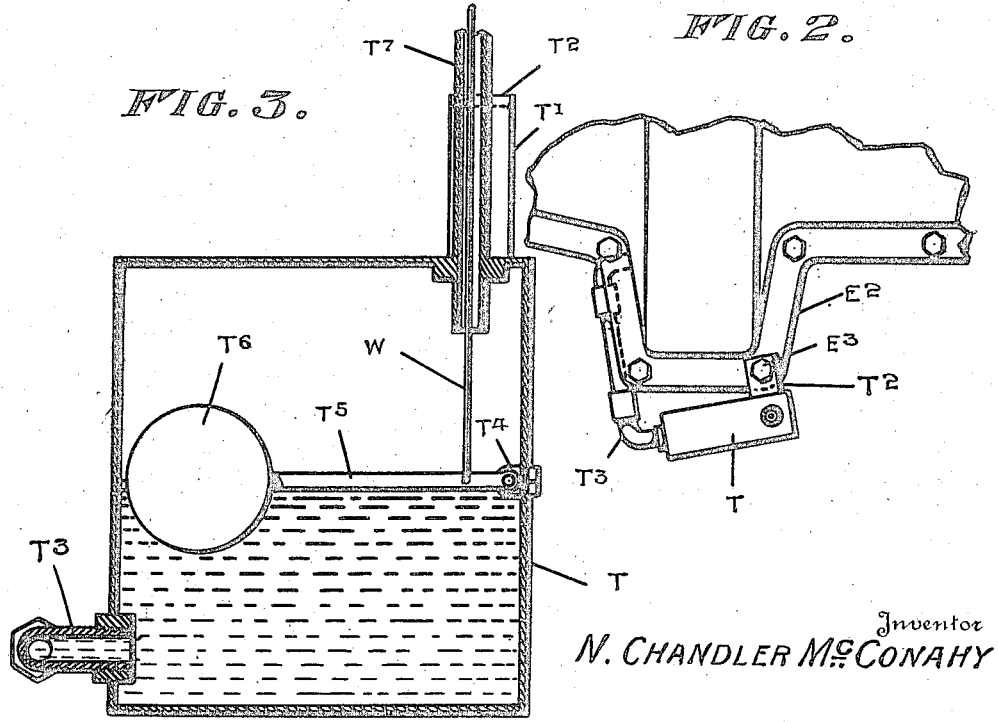

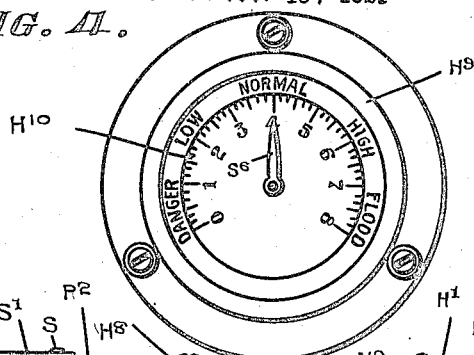
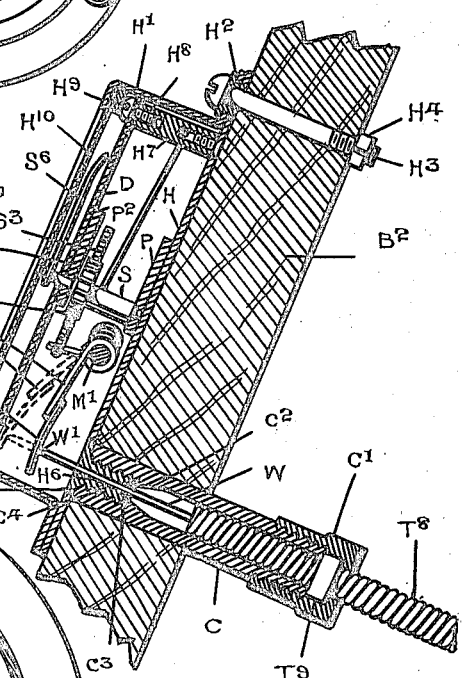
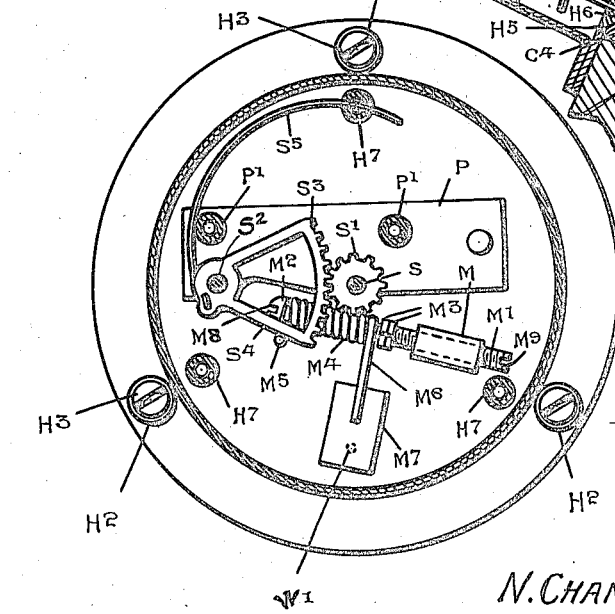

1,462,371

UNITED STATES PATENT OFFICE.

NEWELL CHANDLER McCONAHY, OF TYRONE, PENNSYLVANIA.

INDICATOR.

Application filed October 19, 1921. Serial No. 508,797.

*To all whom it may concern:*

Be it known that I, NEWELL CHANDLER MCCONAHY, a citizen of the United States, residing at Tyrone, in the county of Blair and State of Pennsylvania, have invented certain new and useful Improvements in Indicators, of which the following is a specification.

My invention consists in a new and useful improvement in indicators, and is designed more particularly for use in connection with that class of liquid level indicators generally used on automobiles to indicate the level of oil in the crank case of the engine.

The particularly valuable feature of my invention is the co-operation between the operative parts actuated by the variation of the liquid level and the operative parts designed to indicate the liquid level. I have provided an actuating rod which impinges upon a lever which operates the pointer of the indicator. Thus I have obviated any mechanical connection between the parts actuated by the liquid level and the parts operating the pointer. This feature is of great utility in connection with the installation of my device, since it is possible by the use of my construction to properly proportion the operative parts and accurately adjust them at the factory, thus obviating any adjustment at the time of installation. The device consists of a float tank, with an operating rod, which is applied to the crank case and a housing for the indicator mechanism which is applied to the instrument board. Both of these parts after being adjusted at the factory are sealed, and it is only necessary to insert the end of the operating rod into its socket in the housing to install the device.

Another valuable feature of my device is its ability to indicate a superfluous supply as well as an inadequate supply of oil in the crank case.

Another important feature is the fact that my device is operated by the buoyant effect of the oil to indicate an increasing supply and by spring action to indicate a decreasing supply, thus avoiding any dependence upon the gravital action of the float for actuation.

My invention is fully disclosed in the details of construction illustrated in the drawings and hereinafter fully described, but it is to be understood that I indicated herein only one specific embodiment of my invention and refer for its scope to the claims appended hereto.

In the drawings:

Fig. 1 is a side elevation, partly in section, of a portion of an automobile showing my improved indicator installed.

Fig. 2 is a top plan view showing the installation of the float tank.

Fig. 3 is a vertical section of the float tank.

Fig. 4 is a front elevation of the indicator mechanism.

Fig. 5 is a vertical section through the indicator mechanism.

Fig. 6 is a horizontal section through the indicator mechanism.

Fig. 7 is a side elevation of the indicator mechanism.

In Fig. 1 I have indicated sufficient parts of the engine and frame of an automobile to show the installation of my indicator. The engine E is provided with a crank case $E^1$ having a flange $E^2$. The float tank T is provided with a bracket $T^1$ having an off-set $T^2$, through which is received the bolt $E^3$ which thereby attaches the tank T to the crank case $E^1$. The tank T is provided with an inlet pipe $T^3$ which is adapted to be connected at the opening in the crank case designed to receive the lower pet-cock. Inside the tank T, a pivot bearing $T^4$ is provided at a point on one of the end walls of the tank T mid-way between its top and bottom. When the tank T is installed, it is so positioned that this bearing $T^4$ is level with the upper pet-cock $E^4$ of the crank case $E^1$. In this bearing $T^4$ is pivoted a lever $T^5$ carrying on its outer end the float $T^6$. Immediately above the inner end of this lever $T^5$, the tank T is provided with an upwardly extending pipe $T^7$ which is so proportioned as to extend to a point somewhat below the bottom board B of the automobile when the indicator is installed. A flexible pipe $T^8$ extends upwardly from the end of the pipe $T^7$, through the bottom board B, and is attached to the inner face of the dashboard $B^1$. This pipe $T^8$ is curved toward the instrument board $B^2$ and has its upper end inserted into a tubular casing C which passes through the instrument board $B^2$. The pipe $T^8$ is provided near its upper end with a collar $T^9$ which bears against the end of the casing C which is threaded, and a screw collar $C^1$ surrounds the pipe $T^8$ and serves to bind the collar $T^9$ to the end of the casing C, and thus join the pipe $T^8$ and the casing C.

The indicator mechanism is contained in a circular housing comprising a base plate H and a cover member $H^1$, which are fastened together by eye-rivets $H^2$ through which pass bolts $H^3$ which pass through the instrument board $B^2$ and are fastened thereto by nuts $H^4$, thus holding the housing securely to the instrument board $B^2$. The plate H is provided at the proper point with a transverse bolt $H^5$ which is screwed into the adjacent end of the casing C and is provided with a central bore $H^6$ communicating with the interior of the casing C. The interior of the casing C adjacent the bolt $H^5$ has a reduced portion $C^2$ and the bore $H^6$ adjacent this reduced portion $C^2$ has an enlarged portion $C^3$.

A flexible, non-ductile wire W is attached to the lever $T^5$ and extends upwardly through the pipes $T^7$ and $T^8$, the casing C and the bolt $H^5$. The parts are so proportioned that when the device is installed and the float $T^6$ is at the bottom of the tank T, the upper end $W^1$ of the wire W is exposed within the housing. It will be apparent that the upward movement of the float $T^6$ causes the projection of the wire W into the housing and a corresponding lowering of the float $T^6$ causes the retraction of the wire W.

Suitably mounted on the plate H are three studs $H^7$ upon which is fastened the dial D by means of screws $H^8$. A plate P is riveted to the plate H and studs $P^1$ serve to fasten a second plate $P^2$, adjacent the dial D, to the plate P. Journaled in these plates P and $P^1$ is a shaft S centrally disposed relative to the housing and extending through the center of the dial D, and provided with a pinion $S^1$. Journaled in the plates P and $P^1$ is a rock shaft $S^2$ upon which is mounted a segmental rack $S^3$ meshing with the pinion $S^1$. On the plate H adjacent the plate P is a screw threaded lug M in which is carried a threaded bolt $M^1$ having a head $M^2$ and provided with two lock nuts $M^3$. Loosely mounted on said bolt between the head $M^2$ and the nuts $M^3$ is a collar $M^4$ provided with an arm $M^5$ which impinges the radial arm $S^4$ of the segmental rack $S^3$, and a lever $M^6$ which is provided with a plate $M^7$ disposed over the inner opening of the bore $H^6$ in the bolt $H^5$ and against which the end $W^1$ of the wire W impinges when the device is installed.

The cover member $H^1$ has a bezel $H^9$ which serves to confine the transparent plate $H^{10}$ against a filler ring $H^{11}$ interposed between it and the dial D. In the space between the dial D and the plate $H^{10}$ provided by the filler ring $H^{11}$, the shaft S is provided with a pointer $S^6$.

The dial D may be provided with suitable indicia as shown in Fig. 4.

A spring $S^5$ mounted on one of the studs $H^7$ serves to actuate the segmental rack $S^3$ and the pinion $S^1$ to return the pointer $S^6$ to zero reading.

By reason of the peculiar form of mounting of the collar $M^4$, its arm $M^5$ may be adjusted relative to the arm $S^4$ by the rotation of the screw $M^1$ which may be accomplished by use of either of the slots $M^8$ and $M^9$ in the respective ends of the screw $M^1$.

From the foregoing description of the parts of my device its operation will be obvious. When the device is installed, the level of oil in the tank T will coincide with the oil level in the crank case $E^1$. The buoyancy of the float $T^6$ will cause it to respond to the oil pressure and through the lever $T^5$ will move the wire W. The reciprocation of the wire W will oscillate the plate $M^7$ and lever $M^6$ and consequently oscillate the arm $M^5$ which will cause the segmental rack $S^3$ to actuate the pinion $S^1$ and thus cause the pointer $S^6$ to travel over the dial D. It is to be particularly noted that when the oil level decreases and the float descends the spring is permitted to restore the parts to normal position. Thus it is apparent that my device depends upon the buoyant effect of the oil and the operation of the spring to insure an accurate indication of the oil level in the crank case, which materially contributes to the efficiency and reliability of the device.

Having described my invention, what I claim is:

In an indicator, the combination of a housing provided with an opening; a pointer movably mounted in said housing; a lever pivotally mounted in said housing; a closure plate attached to said lever and normally resting against said housing over its opening; means operated by said lever and adapted to move said pointer; a tubular casing attached to the outside of said housing; a flexible conduit adapted to be removably attached to said casing; and a reciprocable member independently housed in said conduit and said casing and adapted to be protruded into said housing through its opening and impinge against said plate to move said lever.

In testimony whereof I affix my signature.

N. CHANDLER McCONAHY.